(12) United States Patent
Krieger et al.

(10) Patent No.: US 11,223,075 B2
(45) Date of Patent: Jan. 11, 2022

(54) TWO-VOLTAGE BATTERY

(71) Applicant: HELLA GMBH & CO. KGAA, Lippstadt (DE)

(72) Inventors: Juergen Krieger, Zellingen (DE); Hans Joachim Liebscher, Wuerzburg (DE); Sebastian Kahnt, Karlstadt (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 145 days.

(21) Appl. No.: 16/549,717

(22) Filed: Aug. 23, 2019

(65) Prior Publication Data

US 2019/0379091 A1   Dec. 12, 2019

Related U.S. Application Data

(63) Continuation of application No. PCT/EP2018/053559, filed on Feb. 13, 2018.

(30) Foreign Application Priority Data

Feb. 24, 2017 (DE) ...................... 10 2017 103 869.8

(51) Int. Cl.
*H01M 10/48* (2006.01)
*H02H 7/18* (2006.01)
(Continued)

(52) U.S. Cl.
CPC ............ *H01M 10/482* (2013.01); *H02H 7/18* (2013.01); *H02J 1/10* (2013.01); *H02J 7/0016* (2013.01);
(Continued)

(58) Field of Classification Search
CPC .................................................. H01M 10/482
See application file for complete search history.

(56) References Cited

U.S. PATENT DOCUMENTS 6,297,618 B2   10/2001   Emori et al.
10,018,682 B2   7/2018   Kaupp et al.
(Continued)

FOREIGN PATENT DOCUMENTS

DE         60130508 T2    6/2008
DE      102013205102 A1    9/2014
(Continued)

OTHER PUBLICATIONS

International Search Report dated May 23, 2019 in corresponding application PCT/EP2018/053559.

*Primary Examiner* — Olatunji A Godo
(74) *Attorney, Agent, or Firm* — Muncy, Geissler, Olds & Lowe, P.C.

(57) ABSTRACT

A two-voltage battery for a vehicle, having an earth point, having a plurality of battery cells, wherein groups of battery cells connected in series form battery cell blocks, and wherein at least one first battery cell block is preferably permanently connected to the earth point of the two-voltage battery, having a plurality of cell monitors for the battery cell blocks, wherein the cell monitors are designed to monitor a voltage provided by the individual battery cells in the particular battery cell block and/or a current through the battery cells in the particular battery cell block, and having a plurality of power switching elements for selectively connecting the battery cell blocks in parallel and/or in series.

17 Claims, 5 Drawing Sheets

(51) Int. Cl.
  *H02J 1/10*  (2006.01)
  *H02J 7/00*  (2006.01)
  *H02J 9/06*  (2006.01)

(52) U.S. Cl.
  CPC .......... *H02J 7/0026* (2013.01); *H02J 7/0029* (2013.01); *H02J 9/061* (2013.01)

(56) References Cited

U.S. PATENT DOCUMENTS

| | | |
|---|---|---|
| 2006/0279255 A1 | 12/2006 | Yoshida |
| 2007/0200434 A1* | 8/2007 | Gottlieb ............. G01R 31/3648 307/66 |
| 2013/0320768 A1 | 12/2013 | Fujimatsu et al. |
| 2016/0156179 A1* | 6/2016 | Walter ................... H02H 3/202 361/91.1 |
| 2018/0109122 A1 | 4/2018 | Koerner |

FOREIGN PATENT DOCUMENTS

| | | |
|---|---|---|
| DE | 102013210058 A1 | 2/2015 |
| DE | 102013113182 A1 | 5/2015 |
| DE | 102014202626 A1 | 8/2015 |
| DE | 102015104293 A1 | 9/2016 |

\* cited by examiner

TWO-VOLTAGE BATTERY

This nonprovisional application is a continuation of International Application No. PCT/EP2018/053559, which was filed on Feb. 13, 2018, and which claims priority to German Patent Application No. 10 2017 103 869.8, which was filed in Germany on Feb. 24, 2017, and which are both herein incorporated by reference.

BACKGROUND OF THE INVENTION

Field of the Invention

The present invention relates to a two-voltage battery for a vehicle, having a ground point, having a multiplicity of battery cells, wherein groups of series-connected battery cells form battery cell blocks and wherein preferably at least one first battery cell block is permanently connected to the ground point of the two-voltage battery, having a multiplicity of cell monitors for the battery cell blocks, wherein the cell monitors are designed to monitor a voltage provided by the individual battery cells of the relevant battery cell block and/or a current through the individual battery cells of the relevant battery cell block, and having a multiplicity of power switching elements for connecting the battery cell blocks in parallel and/or in series as desired, wherein, in a first connection arrangement the battery cell blocks are connected in parallel and a first voltage is provided at a first terminal, and wherein, in a second connection arrangement the battery cell blocks are connected in a series arrangement and the first voltage is provided at the first terminal and/or a second voltage is provided at a second terminal.

Description of the Background Art

Known from DE 10 2013 113 182 A1 is a two-voltage battery having a multiplicity of battery cell blocks, which in a first connection arrangement provides a first voltage at a first terminal for supplying a first group of electrical loads, and in which a second connection arrangement provides a second voltage at a second terminal for supplying a second group of electrical loads. Bringing the battery cell blocks into the first connection arrangement and/or into the second connection arrangement is accomplished by means of a group of power switching elements. As a function of the switching state of the power switching elements, the battery cell blocks of the generic two-voltage battery are connected in parallel or in series with one another. For example, the two-voltage battery is used to supply power in a 12 V vehicle electrical system and in a 48 V vehicle electrical system in a single vehicle. The two voltages can be made available by the two-voltage battery, in particular simultaneously, through the two different terminals.

SUMMARY OF THE INVENTION

It is therefore an object of the present invention to provide a cell monitor arrangement for the two-voltage battery that makes it equally possible in the different connection arrangements to monitor a voltage supplied by the battery cell blocks or a current through the battery cell blocks, and to centrally provide information in this regard.

In an exemplary embodiment, the cell monitors can be connected through a data line arrangement to a microcontroller of the two-voltage battery, wherein a voltage level adapter is provided between at least individual cell monitors and the microcontroller, which voltage level adapter provides, in the first connection arrangement and in the second connection arrangement of the battery cell blocks, at an output connected directly or indirectly to the microcontroller, an output voltage signal that is in a prespecified voltage level interval for an input voltage signal that is present at an input of the voltage level adapter associated with the associated cell monitor and has a different voltage level in the first connection arrangement and in the second connection arrangement, the interval width of said voltage level interval being smaller than a difference between the voltage level of the input voltage signal in the first connection arrangement and in the second connection arrangement.

The provision of the voltage level adapter makes it possible for the cell monitors to measure the voltage of the individual battery cells of the relevant battery cell block or the current through the battery cells in both the first connection arrangement and the second connection arrangement. In this context, the measurement is independent of a voltage level of the battery cell blocks, which differs at least for individual battery cell blocks for parallel and serial connection of the battery cell blocks. While a voltage that is always equal and low, in particular the first voltage, is always present across the different battery cell blocks during a parallel connection of the battery cell blocks, the voltage of the series-connected battery cell blocks is additive, with the result that a higher voltage, in particular the second voltage, is provided overall. Accordingly, the different battery cell blocks are at a different voltage level in the series arrangement. Consequently, regardless of a voltage level of the associated battery cell block, the cell monitors provided for monitoring the battery cell blocks must always permit reliable monitoring in conjunction with the microcontroller and provide information about this to the central microcontroller of the two-voltage battery.

The voltage level adapter is designed to convert the input voltage signal provided by the cell monitor and to make available at the output an output voltage signal that can be made available indirectly or directly to the microcontroller and can be read in and interpreted or analyzed by the latter. A direct analysis of the output voltage signal by the microcontroller occurs when the voltage level adapter is connected directly to the microcontroller. An indirect analysis provides that additional components, for example another voltage level adapter or another cell monitor, are interposed. The voltage level interval for the output voltage signal is chosen here such that a distinction can be made on the part of the microcontroller between a logical zero on the one hand and a logical one on the other hand. For example, a voltage signal in the range from 0 V to 0.6 V is interpreted as a logical zero and a voltage level of more than 0.6 V to approximately 5 V is interpreted as a logical one.

For example, a cell monitor can be associated with each battery cell block, and a voltage level adapter can be associated with each cell monitor. It is ensured by this means that signals from each cell monitor are converted and, in particular, are handled uniformly. For example, a propagation delay change can occur due to the provision of the voltage level adapter, and the uniform handling of the signals can be achieved due to the provision of a voltage level adapter for every cell monitor. In particular, a reversal of a sequence of the signals upon reception by the microcontroller is prevented.

A voltage level adapter can be provided for every cell monitor that is associated with a battery cell block that is not permanently connected to the ground point of the two-voltage battery. An especially economical solution advantageously results in this way, because the number of voltage level adapters remains small and a voltage level adapter can be omitted for the battery cell blocks or the cell monitors associated with them that have an equal voltage level in the first connection arrangement and in the second connection arrangement or are connected to the ground point of the two-voltage battery.

The cell monitor of the first battery cell block can be capacitively or galvanically connected to the microcontroller through the data line arrangement. The capacitive or galvanic connection can be provided because the first battery cell block of the two-voltage battery is provided at an equal voltage level in the first connection arrangement and in the second connection arrangement.

The data line arrangement can be designed in the manner of a network. Then bus data lines, for example, are provided for communication of the microcontroller with the cell monitors. Alternatively, the data line arrangement can provide a first line routed to the microcontroller and a second line routed to the microcontroller, wherein a voltage difference is delivered to the microcontroller through the first line and the second line, and the output voltage signal or information about a state of the battery cell blocks is determined from the voltage difference.

The microcontroller can be associated uniquely with the two-voltage battery. The microcontroller can be arranged inside a housing of the two-voltage battery or outside the same.

A transmitter with inductive decoupling can be provided as a voltage level adapter, wherein the transmitter provides a microcontroller winding that is connected to the microcontroller and a cell monitor winding that is connected to the cell monitor. The transmitter can be designed as a transformer.

A common transmitter can be associated with a multiplicity of cell monitors. The common transmitter has a multiplicity of cell monitor windings, wherein each cell monitor interacts with at least one cell monitor winding of the common transmitter. In addition, one common microcontroller winding is provided for at least two and preferably for all cell monitor windings of the transmitter. The common transmitter and the common microcontroller winding advantageously bring about a compact construction and, as a result, a small space requirement and/or a cost advantage.

A level converter circuit with galvanic coupling can be provided as a voltage level adapter. The level converter circuit is arranged between two battery cell blocks that are next to one another in the second connection arrangement. The provision of galvanic coupling by means of a level converter circuit is advantageously associated with comparatively low costs.

The level converter circuit can provide a first circuit path for signal transmission from the cell monitor to the microcontroller and a second circuit path for signal transmission from the microcontroller to the cell monitor. By this means, a separate adjustment of the voltage level for signal transmission in the two circuit paths is advantageously made possible.

The level converter circuit can be designed as an integrated circuit. For example, the level converter circuit can be implemented as part of the associated cell monitors and, in particular, be integrated spatially into the cell monitors. A discrete construction of the level converter circuit and/or a spatially separate embodiment of the same are equally possible according to the invention.

More than two battery cell blocks can be connected in series with one another in the second connection arrangement. A voltage level adapter is always provided here between every two adjacent battery cell blocks in the second connection arrangement. Preferably, all voltage level adapters are identical in design. A cost advantage results from providing the identical design of voltage level adapters. Moreover, the regular arrangement of the voltage level adapters is advantageous. It simplifies communication through the data line arrangement as well as installation or assembly.

The transmission of the signals to the microcontroller or the transmission of the signals from the microcontroller to the cell monitors can take place in a cascading manner such that only the first battery cell block interacts directly with the microcontroller through the data line arrangement, and all other battery cell blocks or the cell monitors associated with them communicate with the microcontroller through the first battery cell block. The additional battery cell blocks interact only indirectly with the microcontroller in this regard or are only indirectly connected to the microcontroller.

A first switching module with at least one switching element, with a switching input associated with the switching element, and with a signal output is provided in the first voltage path of the level converter circuit. The at least one switching element is arranged in a first switching state or in a second switching state depending on an input switching signal present at the switching input of the switching element. In the different switching states of the switching element, a resistor or multiple resistors of the first switching module is or are connected differently in such a manner that the voltage level at the signal output of the first switching module in the first switching state of the switching element is different from the voltage level of the signal output in the second switching state with respect to an equal differential voltage at two voltage terminals of the first switching module. Analogously, a second switching module, likewise with at least one switching element, with a switching input associated with the switching element, and with a signal output can be provided in the second voltage path of the level converter circuit. The switching element of the second switching module is arranged in a first switching state or in a second switching state depending on an input switching signal present at the switching input of the switching element, and a resistor or multiple resistors of the second switching module are connected differently as a function of the switching state such that the voltage level at the signal output of the second switching module differs—with respect to an equal differential voltage at two voltage terminals of the second switching module—as a function of the switching state of the switching element. Advantageously, the adaptation of the voltage level can take place in a customized and need-based manner due to the provision of the first switching module and/or the second switching module for the different voltage paths of the level converter circuit. Possibilities for switching elements include, for example, transistors or digital transistors, MOSFET, or other controllable semiconductor elements.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
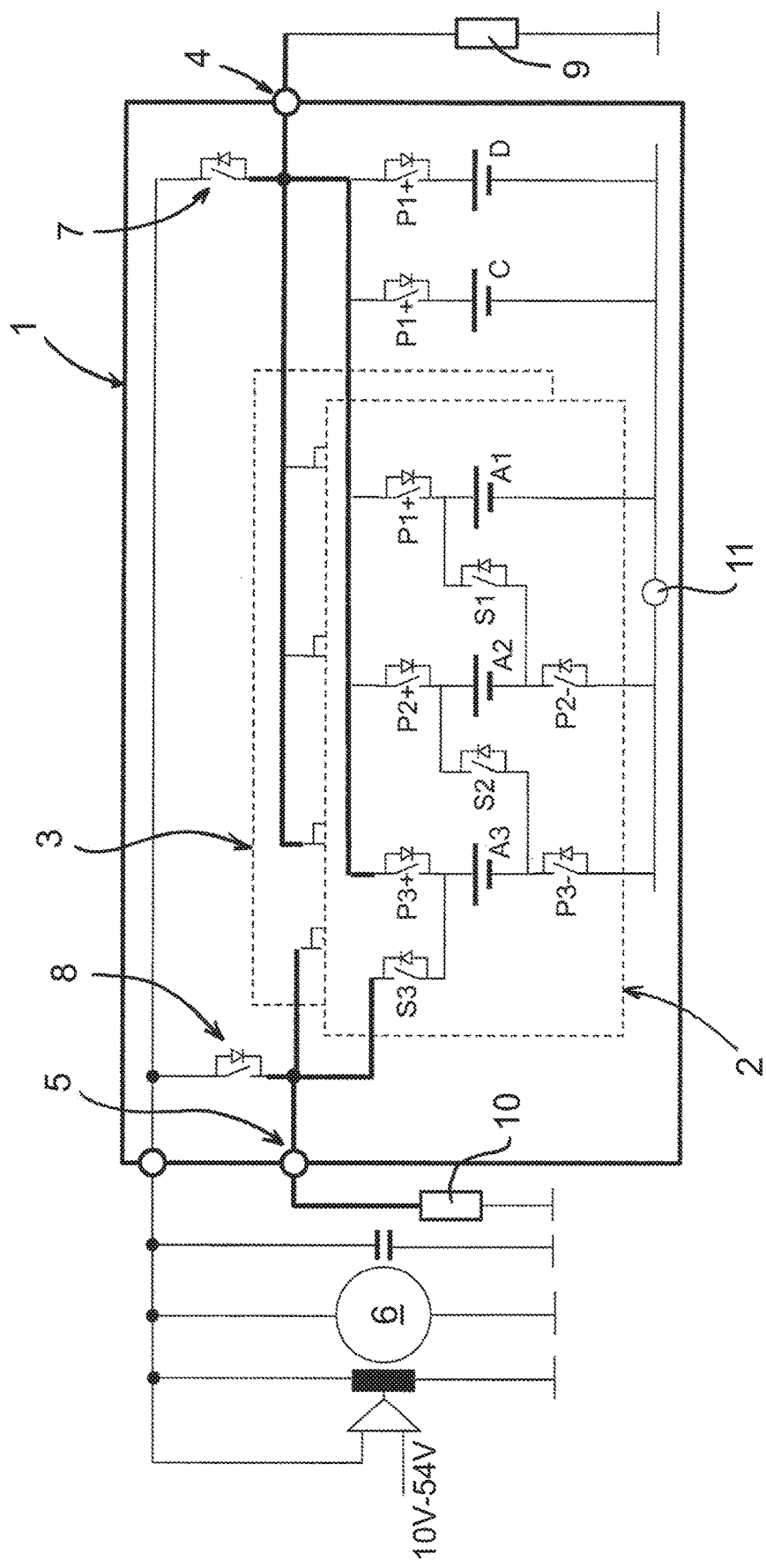
FIG. 1 is a schematic diagram of a two-voltage battery according to the invention with a multiplicity of battery cell blocks that can be connected to one another in a first connection arrangement or in a second connection arrangement.

A two-voltage battery 1 according to FIG. 1 includes a total of eight battery cell blocks A1, A2, A3, C, D, each of which is formed of a multiplicity of series-connected battery cells that are not depicted individually. Of the total of eight battery cell blocks A1, A2, A3, C, D, a first battery cell block A1, a second battery cell block A2, and a third battery cell block A3 form a first group 2 of battery cell blocks A1, A2, A3. Connected in parallel with the first group 2 of battery cell blocks A1, A2, A3 are two fourth battery cell blocks C, D and a second group 3, which is shown as hidden in the schematic circuit diagram in FIG. 1, having three additional battery cell blocks that are not depicted individually.

As power switching elements, parallel connection switches P1+, P2+, P2−, P3+, P3− and series connection switches S1, S2, S3 are associated with the battery cell blocks A1, A2, A3, C, D. The association of the power switching elements P1+, P2+, P2−, P3+, P3−, S1, S2, S3 with the battery cell blocks A1, A2, A3, C, D takes place in such a manner that, in a first connection arrangement of the two-voltage battery 1, all battery cell blocks A1, A2, A3, C, D are connected in parallel with one another. Thus, the first battery cell block A1, the second battery cell block A2, and the third battery cell block A3 of the first group 2 of battery cell blocks A1, A2, A3 are in parallel with one another. Moreover, the battery cell blocks of the second group 3 of battery cell blocks are in parallel with one another and are also in parallel with the battery cell blocks A1, A2, A3 of the first group 2 of battery cell blocks A1, A2, A3. The two groups 2, 3 of battery cell blocks A1, A2, A3 are again connected in parallel with the fourth battery cell blocks C, D. In the first connection arrangement, a first voltage is provided at a first terminal 4 of the two-voltage battery 1.

In the second connection arrangement, the first battery cell block A1, the second battery cell block A2, and the third battery cell block A3 of the first group 2 of battery cell blocks A1, A2, A3 are series-connected or connected in series with one another. The battery cell blocks of the second group 3 of battery cell blocks are likewise connected in series with one another. In the second connection arrangement, a second voltage is provided at a second terminal 5 of the two-voltage battery 1. The second voltage is higher than the first voltage on account of the series arrangement of the battery cell blocks A1, A2, A3.

Optionally, in the second connection arrangement, the first voltage can be provided at the first terminal 4 in addition. Serving to provide the first voltage are the two fourth battery cell blocks C, D and optionally also the first battery cell block A1 of the first group 2 of battery cell blocks A1, A2, A3 in addition to a corresponding first battery cell block of the second group 3 of battery cell blocks.

For example, with respect to a ground point 11, the two-voltage battery 1 provides a first voltage of 12 V at the first terminal 4 and/or a second voltage of effectively 48 V (nominally 36 V) at the second terminal 5. A starter-generator 6 is optionally associated with the two-voltage battery 1. The starter-generator 6 can be connected as desired through a first power switching element 7 at the first voltage and/or through a second power switching element 8 at the second voltage. The starter-generator 6 can be operated by the two-voltage battery 1 or can be used in generator mode to convert braking energy into electrical energy and feed it into the two-voltage battery 1.

At least one first electrical load 9 that is operated at the first voltage is connected to the first terminal 4 of the two-voltage battery 1. At least one second electrical load 10 can be connected in analogous fashion to the second terminal 5 of the two-voltage battery 1. The second electrical load 10 is operated at the second voltage.

According to the invention, cell monitors Z1, Z2, Z3 for monitoring the battery cell blocks are associated with the various battery cell blocks A1, A2, A3, C, D of the two-voltage battery 1.

Figure 2:
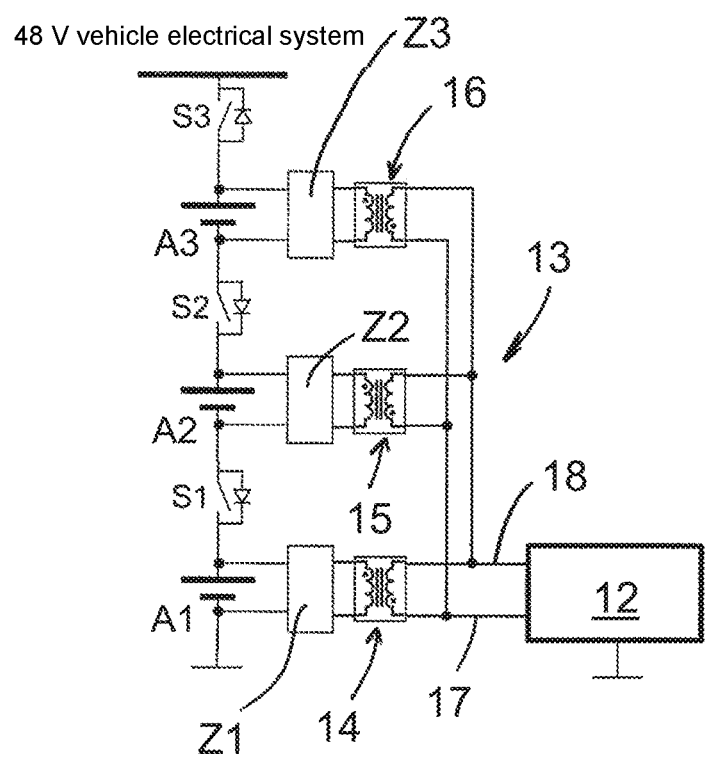
FIG. 2 is a first circuit configuration for a multiplicity of cell monitors of the two-voltage battery associated with the battery cell blocks in the second connection arrangement.

FIG. 2 shows the battery cell blocks A1, A2, A3 of the first group 2 of battery cell blocks A1, A2, A3 in the second connection arrangement, in which the battery cell blocks A1, A2, A3 are connected in series to one another. Likewise shown are the cell monitors Z1, Z2, Z3 associated with the battery cell blocks A1, A2, A3 and also a microcontroller 12 of the two-voltage battery 1. The microcontroller 12 is connected to the cell monitors Z1, Z2, Z3 by a data line arrangement 13. Furthermore, transformers 14, 15, 16 as voltage level adapters or transmitters with inductive decoupling are provided between the cell monitors Z1, Z2, Z3 on the one hand and the microcontroller 12 on the other hand. The transformers 14, 15, 16 each have a cell monitor winding associated with the cell monitors Z1, Z2, Z3 and a microcontroller winding that interacts with the cell monitor winding and is associated with the microcontroller 12. Associated on the microcontroller side with the transformers 14, 15, 16 are a first line 17 and a second line 18, which are routed to the microcontroller 12 and are designed as part of the data line arrangement 13.

The cell monitors Z1, Z2, Z3 are designed to monitor a voltage provided by individual battery cells of the associated battery cell block A1, A2, A3 or a current through the battery cells of the relevant battery cell block A1, A2, A3. The cell monitors Z1, Z2, Z3 transmit the information about the voltage or the current to the microcontroller 12, which in this regard has the information on hand about proper functioning or a fault of the battery cell blocks A1, A2, A3. It is the case here that an output signal from the cell monitors Z1, Z2, Z3 arrives at the transformers 14, 15, 16 serving as voltage level adapters. The signal of the cell monitors Z1, Z2, Z3 will be present there as an input voltage signal and be converted according to the winding configuration into an output voltage signal that lies in a predefined voltage level interval. The output voltage signal arrives at the microcontroller 12 over the data line arrangement 13 with the first line 17 and the second line 18. The microcontroller 12 analyzes a voltage difference between the lines 17, 18.

In the series arrangement of the battery cell blocks A1, A2, A3 from FIG. 2, the first battery cell block A1 is connected to ground. It provides a nominal voltage of 12 V, which serves as a base voltage for the second battery cell block A2. The second battery cell block A2 in turn provides a nominal 12 V voltage, so that the third battery cell block A3 is at 24 V and in turn provides a nominal 12 V. Consequently, a 36 V voltage (effectively: 48 V) is nominally present across the first group of battery cell blocks A1, A2, A3. While a signal voltage between 0 V and 5 V is provided on the part of the cell monitor Z1 associated with the first battery cell block A1 as the input voltage signal for the associated transformer 14, a voltage that is higher by an offset of 12 V, namely 12 V to 17 V, is present as the input voltage signal for the transformer 15 of the cell monitor Z2 associated with the second battery cell block A2. In an analogous manner, 24 V to 29 V are present at the transformer 16 of the cell monitor Z3 associated with the third battery cell block A3. Now, the transformers 14, 15, 16 are designed such that in each case an output voltage signal of 0 V to 5 V is provided at the microcontroller winding as the input signal for the microcontroller 12. For example, a voltage in the range from 0 V to 0.6 V can be interpreted by the microcontroller 12 as a logical zero and as an indication of incorrect functioning of a battery cell block A1, A2, A3, and an input voltage in the range of 0.6 V or more as a logical one and as an indication of proper functioning of the battery cell blocks A1, A2, A3.

According to an alternative embodiment of the invention shown in FIGS. 3 to 6, a level converter circuit 19 is provided as voltage level adapter that serves together with the data line arrangement 13 to connect the cell monitors Z1, Z2, Z3 to the microcontroller 12. The communication of the cell monitors Z1, Z2, Z3 with the microcontroller 12 is galvanically coupled in this regard.

Figure 3:
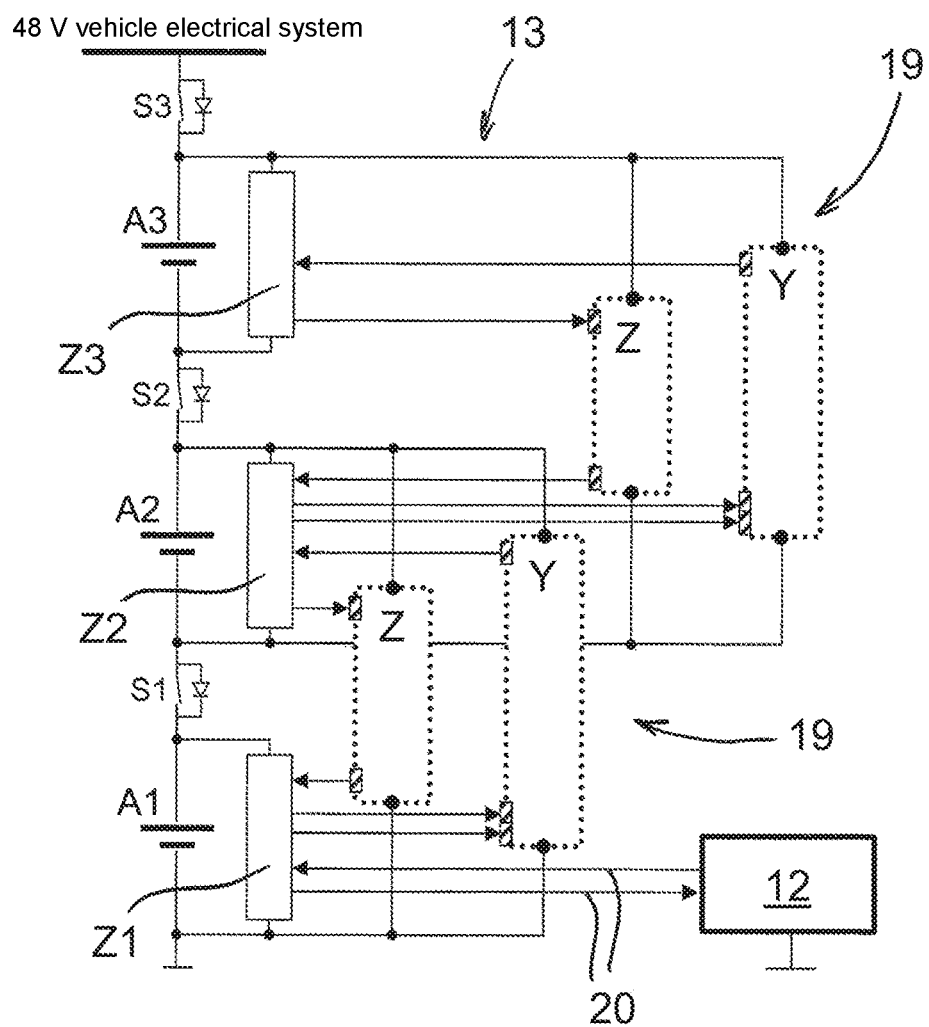
FIG. 3 is a second circuit configuration for the cell monitors of the two-voltage battery from FIG. 1 in the second connection arrangement.
Figure 4:
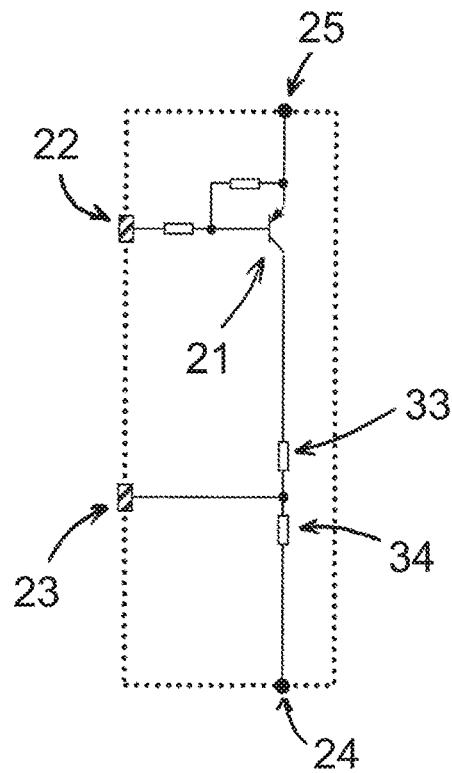
FIG. 4 is a detailed representation of a switching module Z of the circuit arrangement from FIG. 3.
Figure 5:
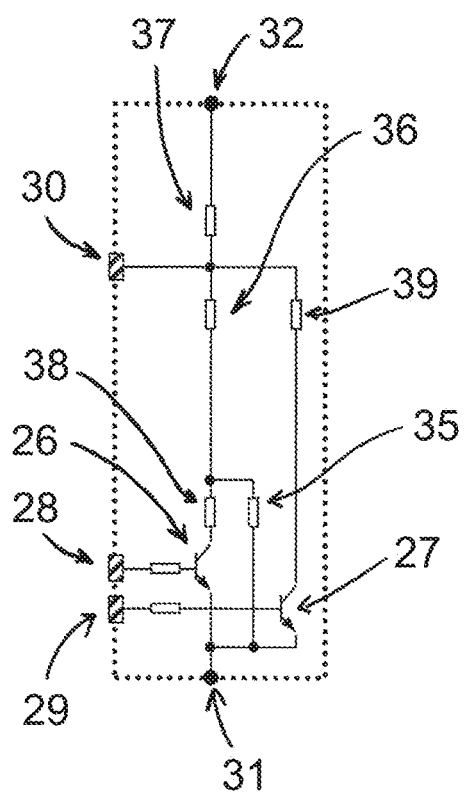
FIG. 5 is a detailed representation of a switching module Y of the circuit arrangement from FIG. 3.

In the series arrangement of the battery cell blocks A1, A2, A3 of the first group 2 of battery cell blocks A1, A2, A3 in FIG. 3, one level converter circuit 19 apiece is provided between the first battery cell block A1 and the second battery cell block A2 on the one hand, and between the second battery cell block A2 and the third battery cell block A3 on the other hand. Moreover, a data bus line 20 to the microcontroller 12 is provided from the first battery cell block A1, which is permanently connected to the ground point 11 of the two-voltage battery 1. The signal transmission between the microcontroller 12 on the one hand and the cell monitors Z1, Z2, Z3 on the other hand takes place over two separate circuit paths in this design. A first circuit path serves for signal transmission from the cell monitor Z1, Z2, Z3 to the microcontroller 12, and a second circuit path serves for signal transmission from the microcontroller 12 to the cell monitors Z1, Z2, Z3. The level converter circuit 19 can be implemented discretely or can be composed of an integrated circuit that is, e.g., also integrated spatially into the cell monitors Z1, Z2, Z3 themselves.

In the first voltage path of the level converter circuit 19, two structurally identical first switching modules Z are provided for communication from the cell monitor Z1, Z2, Z3 to the microcontroller 12. The first switching module Z is shown in detail in FIG. 4. It includes a switching element 21, which preferably is implemented as a transistor or digital transistor, a switching input 22 associated with the switching element 21, and a signal output 23. Moreover, two voltage terminals 24, 25 are provided on the first switching module Z.

The second voltage path, through which the signal transmission from the microcontroller 12 to the cell monitors Z1, Z2, Z3 takes place, provides two structurally identical second switching modules Y. A second switching module Y is shown in detail in FIG. 5. The second switching module Y provides two switching elements 26, 27 with a switching input 28, 29 associated with each of the switching elements 26, 27. Moreover, a signal output 30 is provided. In addition, two voltage terminals 31, 32 are formed for the second switching module Y.

For the series-connection of the battery cell blocks A1, A2, A3 in FIG. 3, the voltage difference across the voltage terminals 24, 25 of the first switching module Z or across the voltage terminals 31, 32 of the second switching module Y is nominally 24 V in each case for the first voltage path (signal transmission from the cell monitor Z1, Z2, Z3 to the microcontroller 12). A voltage difference of 12 V is present across the cell monitors Z1, Z2, Z3 in each case, wherein the first cell monitor Z1 associated with the first battery cell block A1 operates nominally between 0 V and 12 V, the second cell monitor Z2 associated with the second battery cell block A2 operates nominally between 12 V and 24 V, and the third cell monitor Z3 associated with the third battery cell block A3 operates nominally between 24 V and 36 V.

Using the example of the level converter circuit 19 between the second battery cell block A2 and the first battery cell block A1, the operating principle of the voltage level adapter in the serial arrangement is explained separately for the first circuit path and the second circuit path by way of example below. It is assumed here that the ports for the communication of each cell monitor Z1, Z2, Z3 are designed for a voltage range of 0 V to 5 V relative to the lower supply voltage. Accordingly, the signal for the first signal path in the case of the second cell monitor Z2 can be 12 V or 17 V—depending on the bit to be transmitted at the time. For the output signal, the voltage level interval from 0 V to 5 V must be transmitted so that it can be analyzed by means of the microcontroller 12 or the first cell monitor Z1. Analogously, a microcontroller signal in the range from 0 V to 5 V is converted through the second circuit path into a signal for the second cell monitor Z2 in the range from 12 V to 17 V.

The signal coming from the second cell monitor Z2 is in the region of 12 V or 17 V. It is associated with the first switching module Z through the switching input 22, wherein the switching element 21 of the first switching module Z is implemented as a PNP transistor, which is switched to conduct in the event of an incoming logical zero. Since a voltage difference of 24 V is present across the voltage terminals 24, 25 in the series arrangement (second connection arrangement), a signal of 5 V can be tapped through the voltage divider for two resistors 33, 34 when the transistor 21 is conducting. If the transistor 21 is not conducting, 0 V is present at the signal output 23. It should be noted here that in the case of a logical one at the switching input 22, the switching element 21 blocks, and thus a logical zero (0 V) is present at the signal output 23. In the case of a logical zero at the switching input 22, the transistor 21 conducts, and thus a logical one is present at the signal output 23. Thus, the switching module Z has an inverting characteristic.

For the second circuit path, the second switching element 27 of the second switching module Y is designed to block in the serial configuration. A logical zero is continuously present at the second switching input 29 in this regard. In the serial configuration, only the first switching input 28 of the second switching module Y is used for switching or transmission. In the case of a logical zero at the switching input 28 of the first switching element 26, the first switching element 26 blocks. A voltage is then present at the signal output 30 that results solely from the voltage divider formed by the resistors 35, 36, 37, taking into account the voltage across the voltage terminals 31, 32. In the case of a logical one at the switching input 28, the switching element 26 conducts and the voltage at the signal output 30 is defined by the voltage divider formed by the resistors 36, 37, 38 and by the non-switchable resistor 35 connected in parallel. The resistors 35, 36, 37, 38 are selected in this case such that an output voltage of approximately 17 V is established when the switching element 26 blocks, and an output voltage close to 12 V is established when the switching element conducts.

A configuration of the level converter circuit 19 that is provided between the third battery cell block A3 and the second battery cell block A2 is selected in an analogous fashion. The circuit paths and the first switching module Z and the second switching module Y are of the same design. Operation and signal transmission take place in the same manner based on the premise that, in the series circuit arrangement from FIG. 3, the voltage level for the second cell monitor is nominally 12 V to 24 V and for the third cell monitor is nominally 24 V and 36 V, and that nominally 12 V to 36 V, which is to say a voltage difference of 24 V, is present across the voltage terminals 24, 25, 31, 32. The switching inputs 22, 28, 29 and the signal outputs 23, 30 of the switching modules Z, Y are each above the above-discussed configuration by 12 V.

A signal transmission from the microcontroller 12 to the first battery cell block A1 takes place solely through the bus data line 20. A signal transmitted from the microcontroller 12 to the second battery cell block A2 is transmitted through the first battery cell block A1 and from there through the first switching module Z of the level converter circuit 19 to the second battery cell block A2. A signal transmission from the microcontroller 12 to the third battery cell block A3 takes place through the first battery cell block A1, the first switching module Z, the second battery cell block A2, and the additional first switching module Z to the third battery cell block A3.

In analogous fashion, transmission of the signal from the battery cell blocks A1, A2, A3 to the microcontroller 12 takes place in a cascading manner such that a signal from the third battery cell block A3 is transmitted through the second switching module Y to the second battery cell block A2, and from there through the additional second switching module Y to the first battery cell block A1. From the second battery cell block A2, the signal is transmitted through the second switching module Y to the first battery cell block A1, and from there to the microcontroller 12. Transmission from the first battery cell block A1 to the microcontroller 12 takes place over the data bus line 20.

Figure 6:
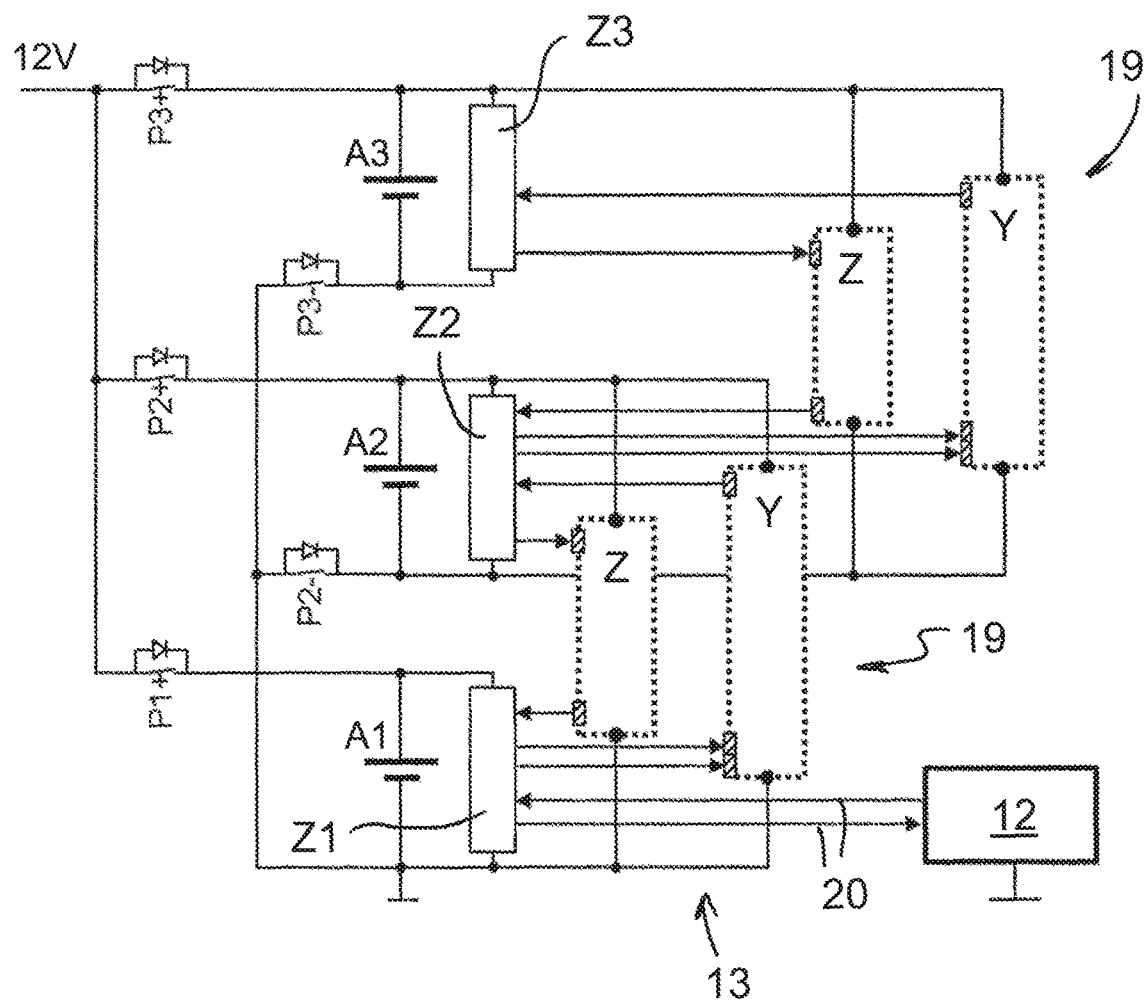
FIG. 6 shows the circuit configuration of the cell monitors of the two-voltage battery from FIG. 3 in the first connection arrangement.

In the parallel configuration of the battery cell blocks A1, A2, A3 of the first group 2 of battery cell blocks A1, A2, A3 from FIG. 6, all cell monitors Z1, Z2, Z3 and the switching modules Z, Y are at a voltage difference of 12 V between 0 V and 12 V. The method of operation of the first switching module Z in this case is analogous to the description above. However, a voltage of 0 V or approximately 2.5 V is present at the signal output 23. The difference in the voltage level is great enough, however, that a logical zero and logical one can be distinguished not only by an input port of the cell monitor Z1, Z2, Z3 but also by the microcontroller 12.

For the second switching module Y in the parallel configuration, the first switching element 26 is continuously switched to conduct and the second switching element 27 is actuated. In the case of a logical zero at the second switching input 29, the second switching element 27 blocks, and the voltage drop across the resistor 39 has no effect on the signal output 30. In contrast, when the second switching element 27 conducts in the case of a logical one at the input 29, the resistor 39 contributes to determining the signal output 30. The resistors 35, 36, 37, 38 on the one hand, and also the resistor 39, which is relevant only in the parallel configuration, are selected such that an output voltage of nominally 5 V is established in the event of a blocking transistor 27, and an output voltage of nominally 0 V is established in the event of a conducting transistor 27. The second switching module Y likewise has an inverting characteristic here. A logical one at the input 29 of the transistor results in a logical zero at the output 30, and a logical zero at the input 29 results in a logical one at the output 30.

The same components and component functions are labeled with the same reference symbols.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A two-voltage battery for a vehicle, comprising:
a ground point;
a plurality of battery cells, wherein groups of series-connected battery cells form battery cell blocks and at least one first battery cell block is permanently connected to the ground point of the two-voltage battery;
a plurality of cell monitors for the battery cell blocks, the cell monitors monitor a voltage provided by individual battery cells of the relevant battery cell block and/or a current through the individual battery cells of the relevant battery cell block; and
a plurality of power switching elements in order to selectively connect the battery cell blocks between parallel and series, wherein, in a first connection arrangement the battery cell blocks are connected in parallel and a first voltage is provided at a first terminal, and wherein, in a second connection arrangement the battery cell blocks are connected in a series arrangement and the first voltage is provided at the first terminal and/or a second voltage is provided at a second terminal,
wherein the cell monitors are connected through a data line arrangement to a microcontroller of the two-voltage battery, and
wherein at least one voltage level adapter is provided between at least individual cell monitors and the microcontroller, the at least one voltage level adapter providing, in the first connection arrangement and in the second connection arrangement of the battery cell blocks, at an output connected directly or indirectly to the microcontroller, an output voltage signal that is in a prespecified voltage level interval for an input voltage signal that is present at an input of the at least one voltage level adapter associated with the associated cell monitor and has a different voltage level in the first connection arrangement and in the second connection arrangement, an interval width of said voltage level interval being smaller than a difference between the voltage level of the input voltage signal in the first connection arrangement and in the second connection arrangement.

2. The two-voltage battery according to claim 1, wherein a voltage level adapter is provided for every cell monitor of a battery cell block that is not permanently connected to the ground point of the two-voltage battery.

3. The two-voltage battery according to claim 1, wherein the data line arrangement is a network and provides bus data lines for communication of the microcontroller with the cell monitors,
wherein a voltage difference between the bus data lines is provided at the microcontroller for analysis of the output voltage signal.

4. The two-voltage battery according to claim 1, wherein the relevant cell monitor of the first battery cell block is capacitively or galvanically connected to the microcontroller through the data line arrangement.

5. The two-voltage battery according to claim 1, wherein a transmitter with inductive decoupling is provided as the voltage level adapter,
wherein the transmitter has a microcontroller winding that is connected directly or indirectly to the microcontroller and a cell monitor winding that interacts with the relevant cell monitor.

6. The two-voltage battery according to claim 5, wherein a transformer is provided as the transmitter.

7. The two-voltage battery according to claim 5, wherein one common transmitter is provided at least for the plurality of cell monitors, wherein the common transmitter has a plurality of cell monitor windings, wherein each cell monitor of the individual battery cells interacts with at least one cell monitor winding of the plurality of cell monitor windings, and wherein one common microcontroller winding is provided for at least two cell monitor windings.

8. The two-voltage battery according to claim 1, wherein a level converter circuit with galvanic coupling is provided as a voltage level adapter of the at least one voltage level adapter, the level converter circuit being arranged between two adjacent battery cell blocks in the second connection arrangement.

9. The two-voltage battery according to claim 8, wherein the level converter circuit provides a first circuit path for signal transmission from the cell monitor to the microcontroller and a second circuit path for signal transmission from the microcontroller to the cell monitor.

10. The two-voltage battery according to claim 8, wherein the level converter circuit is an integrated circuit or wherein the level converter circuit is a discrete circuit.

11. The two-voltage battery according to claim 8, wherein more than two battery cell blocks are connected in series with one another in the second connection arrangement, wherein a level converter circuit is provided between every two adjacent battery cell blocks, and wherein all level converter circuits are substantially identical in design.

12. The two-voltage battery according to claim 8, wherein the microcontroller is connected directly to the first battery cell block through the data line arrangement, and wherein all battery cell blocks that are not permanently connected to the ground point of the two-voltage battery are connected indirectly to the microcontroller through the first battery cell block.

13. The two-voltage battery according to claim 9, wherein a first switching module with at least one switching element, with a switching input associated with the switching element, and with a signal output is provided in the first voltage path of the level converter circuit and/or wherein a second switching module with at least one switching element, with a switching input associated with the switching element, and with a signal output is provided in the second voltage path of the level converter circuit, wherein the switching element is arranged in a first switching state or in a second switching state depending on an input switching signal present at the switching input of the switching element, and wherein in the different switching states, at least one resistor of the first switching module and/or of the second switching module is connected differently in such a manner that the voltage level at the signal output of the first switching module and/or of the second switching module is different in the first switching state of the switching element from the voltage level of the signal output in the second switching state.

14. The two-voltage battery according to claim 13, wherein with respect to two voltage terminals of the first switching module and/or with respect to two voltage terminals of the second switching module, a greater voltage difference is present at the first switching module and/or at the second switching module in the second connection arrangement than in the first connection arrangement.

15. A two-voltage battery for a vehicle, comprising:
a ground point;
a plurality of battery cells, wherein groups of series-connected battery cells form battery cell blocks and at least one first battery cell block is permanently connected to the ground point of the two-voltage battery;
a plurality of cell monitors for the battery cell blocks, the cell monitors monitor a voltage provided by individual battery cells of the relevant battery cell block and/or a current through the individual battery cells of the relevant battery cell block; and
a plurality of power switching elements to connect the battery cell blocks in parallel and/or in series, wherein, in a first connection arrangement the battery cell blocks are connected in parallel and a first voltage is provided at a first terminal, and wherein, in a second connection arrangement the battery cell blocks are connected in a series arrangement and the first voltage is provided at the first terminal and/or a second voltage is provided at a second terminal,
wherein the cell monitors are connected through a data line arrangement to a microcontroller of the two-voltage battery, and
wherein at least one voltage level adapter is provided between at least individual cell monitors and the microcontroller, the at least one voltage level adapter providing, in the first connection arrangement and in the second connection arrangement of the battery cell blocks, at an output connected directly or indirectly to the microcontroller, an output voltage signal that is in a prespecified voltage level interval for an input voltage signal that is present at an input of the at least one voltage level adapter associated with the associated cell monitor and has a different voltage level in the first connection arrangement and in the second connection arrangement, an interval width of said voltage level interval being smaller than a difference between the voltage level of the input voltage signal in the first connection arrangement and in the second connection arrangement, and
wherein the at least one voltage level adapter provides a first output voltage signal in a first voltage level interval for a first input voltage signal and provides a second output voltage signal in a different second voltage level interval for a different second input voltage signal.

16. The two-voltage battery according to claim 1, wherein the data line arrangement provides a first line routed to the microcontroller and a second line routed to the microcontroller, wherein a voltage difference between the first line and the second line is provided at the microcontroller for analysis of the output voltage signal.

17. The two-voltage battery according to claim 1, wherein, in the second connection arrangement the battery cell blocks are connected in the series arrangement and the first voltage is provided at the first terminal and in addition the second voltage is provided at the second terminal.

* * * * *